(12) United States Patent
Najbert

(10) Patent No.: US 7,839,639 B2
(45) Date of Patent: Nov. 23, 2010

(54) ATTACHMENT ASSEMBLY FOR MOUNTING ELECTRONIC DEVICES

(75) Inventor: Radoslaw Najbert, Zielona Gora (PL)

(73) Assignee: Advanced Digital Broadcast S.A., Chambesy (CH)

( * ) Notice: Subject to any disclaimer, the term of this patent is extended or adjusted under 35 U.S.C. 154(b) by 61 days.

(21) Appl. No.: 12/469,807

(22) Filed: May 21, 2009

(65) Prior Publication Data
US 2009/0310303 A1 Dec. 17, 2009

(30) Foreign Application Priority Data
Jun. 11, 2008 (EP) ................... 08465005

(51) Int. Cl.
*H05K 7/20* (2006.01)
*G06F 1/16* (2006.01)
(52) U.S. Cl. .................. 361/695; 361/679.36; 361/694
(58) Field of Classification Search ................................
361/679.34–679.37, 694, 695; 454/184
See application file for complete search history.

(56) References Cited
U.S. PATENT DOCUMENTS

| | | | |
|---|---|---|---|
| 4,713,714 A | 12/1987 | Gatti et al. | |
| 4,926,291 A * | 5/1990 | Sarraf | 361/679.36 |
| 4,937,806 A * | 6/1990 | Babson et al. | 720/651 |
| 5,927,386 A * | 7/1999 | Lin | 165/80.3 |
| 6,233,148 B1 * | 5/2001 | Shen | 361/695 |
| 6,378,832 B1 * | 4/2002 | Li et al. | 248/637 |
| 6,867,963 B2 * | 3/2005 | Staiano | 361/679.34 |
| 7,123,474 B2 * | 10/2006 | Cho | 361/679.34 |
| 2002/0051338 A1 * | 5/2002 | Jiang et al. | 361/685 |
| 2005/0088778 A1 * | 4/2005 | Chen et al. | 360/97.02 |
| 2005/0237709 A1 * | 10/2005 | Huang | 361/685 |
| 2006/0181845 A1 * | 8/2006 | Shah et al. | 361/685 |

\* cited by examiner

*Primary Examiner*—Gregory D Thompson
(74) *Attorney, Agent, or Firm*—Mark M. Friedman

(57) ABSTRACT

An attachment assembly for mounting at least one electronic device is provided with a cradle (101) with a bottom part (109). Furthermore, the cradle (101) comprises a first arm (105) arranged such that the electronic device is fastened to the first arm (105) using the electronic device bottom fastening means, and a second arm (108) arranged such that the electronic device (150) is fastened to the second arm (108) using the electronic device side fastening means. To the cradle (101) can be mounted a fan (107) which can be placed under the electronic device and arranged between the first arm (105) and the second arm (108) of the cradle (101), such that air is blown towards the electronic device mounted to the cradle (101). To allow the air flowing from underneath of the cradle (101) to the fan (107), the cradle (101) has an opening (185) in the bottom part (109).

10 Claims, 6 Drawing Sheets

ATTACHMENT ASSEMBLY FOR MOUNTING ELECTRONIC DEVICES

CROSS-REFERENCE TO RELATED APPLICATIONS

This application claims priority to the European Patent Application No. EP08645005 filed on Jun. 11, 2008, the contents of which are incorporated herein by reference.

BACKGROUND OF THE INVENTION

1. Field of the Invention

The invention concerns an attachment assembly for mounting electronic devices, especially for mounting hard disks drives.

2. Brief Description of the Background of the Invention Including Prior Art

Increased level of complexity of home electronic appliances, such as television set-top boxes, digital video recorders, home media servers, DVD players or personal computers, calls for a careful design of those appliances, taking into account many factors important for their proper operation.

An important issue is an assembly of disk drives, such as optical disk drives or hard disk drives, to provide their proper operating conditions. There are several aspects that should be taken into account, namely isolation of vibrations, protection from mechanical shocks and efficient cooling. The designs of mounting kits should be cost-effective both at manufacturing and assembly stages of a production process.

Modern disk drives operate at high rotational speeds, which cause vibrations of the drive. The vibrations, if not properly isolated, can be transferred to the housing of the appliance, which may result in a disturbing noise, highly undesirable by a user. Moreover, home appliances are often displaced, for example during house cleaning. If the displacement occurs during operation of the disk drive, and results in a mechanical shock to the device, the disk drive may function improperly or even become damaged. Furthermore, disk drives, especially modern, high-speed hard disk drives, emit large amounts of heat, which should be efficiently transferred away from the disk drive. Cooler disk drives run quieter and last longer than disk drives operating unprotected from overheating.

A known solution, published in a U.S. Pat. No. 4,713,714 patent, discloses a computer peripheral shock mount for limiting motion-induced errors. According to its specification a cradle rests in a mounting plate having a lower surface accommodating the lower surface of the cradle, a vertical wall on each side of its lower surface, and a flange extending outwardly from each wall.

In order to attenuate the magnitude of mechanical shocks and vibrations reaching the disk drive assembly, resilient means are provided for coupling the cradle member to the mounting plate in the form of rubber or plastic compressible vibration isolators, that, in the preferred embodiment, are spheroid shaped. They may be formed of any suitable material and may assume any appropriate shape that will serve as an effective shock absorber between the cradle and the mounting plate.

In this prior art, 2 cradles are needed, which makes the solution inefficient also in terms of cost. The drive is mounted using bottom mountings only and 2 cradles form a kind of suspension for the electronic device mounted in the assembly.

Additionally, according to the U.S. Pat. No. 4,713,714 disclosure, in order to prevent an undue motion of the cradle, relative to the mounting plate, in an up-and-down direction as well as in a back-and-forth direction along a line from the front of disk drive assembly to the back thereof, movement limiters are provided. Therefore there is no prevention of an undue motion in a side to side direction.

Drawbacks of the aforementioned prior art therefore include lack of sufficient cooling of a closed electronic equipment, expensiveness and insufficient attenuation of vibrations or shock caused along side-side axis.

Therefore, there is a need for a cost-effective attachment assembly of electronic devices, which would provide isolation of vibrations in all axes, protection from mechanical shocks that may occur in operating mode or during transportation, and would not limit the design of the casing, hence enabling a casing design allowing efficient cooling.

SUMMARY OF THE INVENTION

Purposes of the Invention

The primary objective of the present invention is to provide an improved attachment assembly of electronic devices, and a complementary fan mounting, in order to dampen the vibration, passing through a casing to a surface where the device is fitted, and the shock, received from any direction, to the casing so that the electronic device is protected from impact to the casing and is efficiently cooled as well as quiet while in operating mode.

To accomplish the foregoing objective, the attachment assembly for mounting at least one electronic device having side fastening means and bottom fastening means comprises a cradle with a first arm and a second arm to which the electronic device is fastened. The cradle is arranged such that the electronic device is fastened to the first arm using the electronic device bottom fastening means, and a second arm arranged such that the electronic device is fastened to the second arm using the electronic device side fastening means. Furthermore, to the cradle a fan is mounted, which is placed under the electronic device and arranged between the first arm and the second arm of the cradle, such that air is blown towards the electronic device mounted to the cradle. The cradle can have an opening in the bottom part so as to facilitate air flow from underneath of the cradle to the fan.

Preferably, the first arm has an offset to form a fan cavity for inserting the fan. The offset can be formed by a first extension part, the bottom part and the second arm or a second extension part. Planes of a first extension part and the second arm can be situated substantially perpendicularly to a plane of the first arm. In other embodiment the planes as well as a plane of the second arm can be inclined in respect to the plane of the first arm.

Preferably, the fan is arranged on the bottom part of the cradle and/or is mounted with flexible fastening means and/or receives air from outside a chassis to which the attachment assembly is mounted.

In preferred embodiment sway space is provided in proximity to the fan.

The cradle can have first cut-outs in the first arm and second cut-outs in the second arm, adapted for receiving attenuating elements.

It is of special advantage that the attenuating elements are made of a material that has hardness in a range between 3 and 20 when measured in Shore A scale and have a through hole for receiving a fastening means.

Preferably, the received attenuating elements are positioned such that, when connected by imaginary lines, a shape of a quadrilateral with two sides parallel is formed.

In a further embodiment the fan can be mounted on an external casing and inserted in an opening made in the bottom part of the cradle.

BRIEF DESCRIPTION OF THE DRAWINGS

Other objects, advantages and novel features of the invention will become more apparent from the following detailed description of exemplary embodiments, when taken in conjunction with the accompanying drawings, in which.

DESCRIPTION OF INVENTION AND PREFERRED EMBODIMENT

In the following description, terms used to define relative orientation and placement, such as horizontal, vertical, left, right, side, over, under, front, back, top and bottom, are used. It is to be understood that these terms refer to relative directions and placement in a two dimensional layout with respect to a given orientation of the layout. For a different orientation of the layout, different relative orientation and placement terms may be used to describe the same objects or operations.

Figure 1:
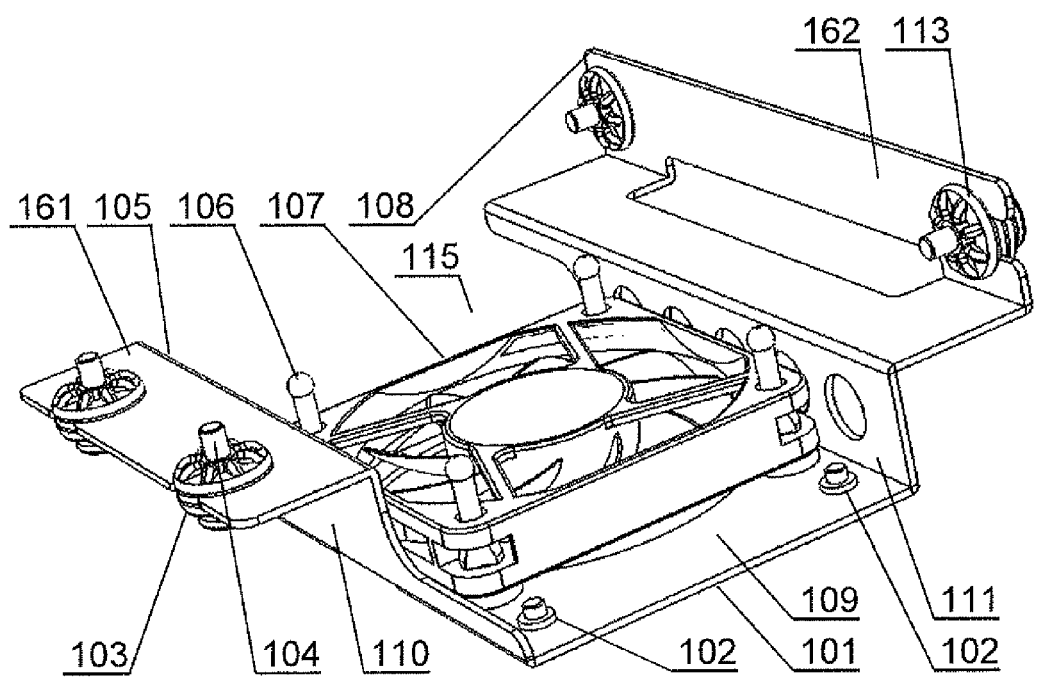
FIG. 1 shows a perspective view of an attachment assembly.

As shown in FIG. 1 an attachment assembly, according to the present technical concept, comprises a cradle 101, preferably made from solid, hard material, for example a sheet metal having a thickness of 1 millimeter. The cradle 101 shall form a single unit with a chassis (not shown) of a device comprising the attachment assembly of FIG. 1, when the attachment assembly is fastened to the chassis by means of at least two fastening means, preferably screws 102. The cradle 101 therefore comprises openings configured for fastening the cradle 101 to the chassis by means of screws 102 being the fastening means. A first arm 105 of the cradle 101 may have an offset 115 to form a fan cavity 115 for inserting a fan 107. The offset 115 can be formed by a first extension part 110, a bottom part 109 and a second arm 108 or a second extension part 111. Planes of the first extension part 110 as well as a plane 162 of the second arm 108 can be situated substantially perpendicularly to a plane 161 of the first arm 105. The cradle 101 shown in FIG. 1 also comprises openings configured for receiving fan fastening means 106 so as to fasten the fan 107 mounted on the bottom part 109 of the cradle 101, inside the cradle 101 in the fan cavity 115. In another embodiment the fan 107 may be mounted on a casing's lower part and received by the cradle such that it is positioned between the first arm 105 and the second arm 108.

In the presented embodiment, four fan fastening means 106 have been used. It is understood that there may be fewer or more fan fastening means 106, which may also serve as attenuating means. The fan fastening means 106 are preferably made of a flexible material that will attenuate vibrations caused by the fan 107. The flexibility of fan fastening means 106 has to be selected such that the vibrating fan 107 will not get in contact directly with the cradle 101. In one embodiment the fan 107 is suspended with soft plastic standoffs.

Preferably sway space for the fan 107 is provided in the cradle 101, between the arms 105 and 108. The sway space is provided in proximity to the fan 107 and its size depends on the flexibility of the fan fastening means 106 and amount of vibrations that the fan 107 may generate. Owing to such an arrangement any vibrations generated by the fan 107 will not be transferred to the cradle 101 or subsequently the disk drive and the chassis.

The fan 107 is arranged on the bottom part 109 of the cradle 101 so as to facilitate reception of cool air from below of the cradle 101. A chassis may be specially adapted for such an arrangement by providing an arrangement that will give the fan 107 access to cool air from outside of the chassis. The chassis may have an opening directly under the cradle 101 coaxially with the opening 185 shown in FIG. 10.

Preferably the fan 107 blows air directly onto a mounted electronic appliance, in case of a hard disk right at the hard disk motor.

The bottom mounting of the 107 fan also serves a purpose of lowering noise generated by the fan 107. A direction of sound wave propagation is set perpendicular to a user sitting in front of a device comprising an attachment assembly according to the present technical concept. Even reflection of the sound wave outside the device will not absorb or disturb the user. The fan 107 is covered by a hard disk drive and sound waves generated by the fan 107 are reflected from the bottom of the hard disk. Soft mounting of the fan 107 further improves level of noise caused by vibration of the fan 107.

The cradle 101 comprises additionally two arms 105 and 108 such that one arm 105 is substantially parallel to a bottom and top of an electronic device that will be mounted in the cradle 101 while the other arm 108 is substantially parallel to a left and right side of an electronic device that will be mounted in the cradle 101. In a typical embodiment the arm 105 will be placed horizontally while the arm 108 will be situated vertically with respect to the bottom part 109. Depending on the size of the fan 107 the arm 105 may extend sidewards directly from the bottom part 109 of the cradle 101 or via an extension part 110. Additionally depending on the size of the fan 107 the arm 108 may extend upwards directly from the bottom part 109 of the cradle 101 or via an extension part 111 serving as a flange.

In a typical working environment an attachment assembly, according to the present technical concept, comprising a disk drive, will be set in parallel to a side of a device casing, for example a digital video recorder casing. The attenuating elements 103 placement schema is not based on a square or a rectangle shape in order to set a vibration vector outside typical X, Y or Z axes.

Figure 5:
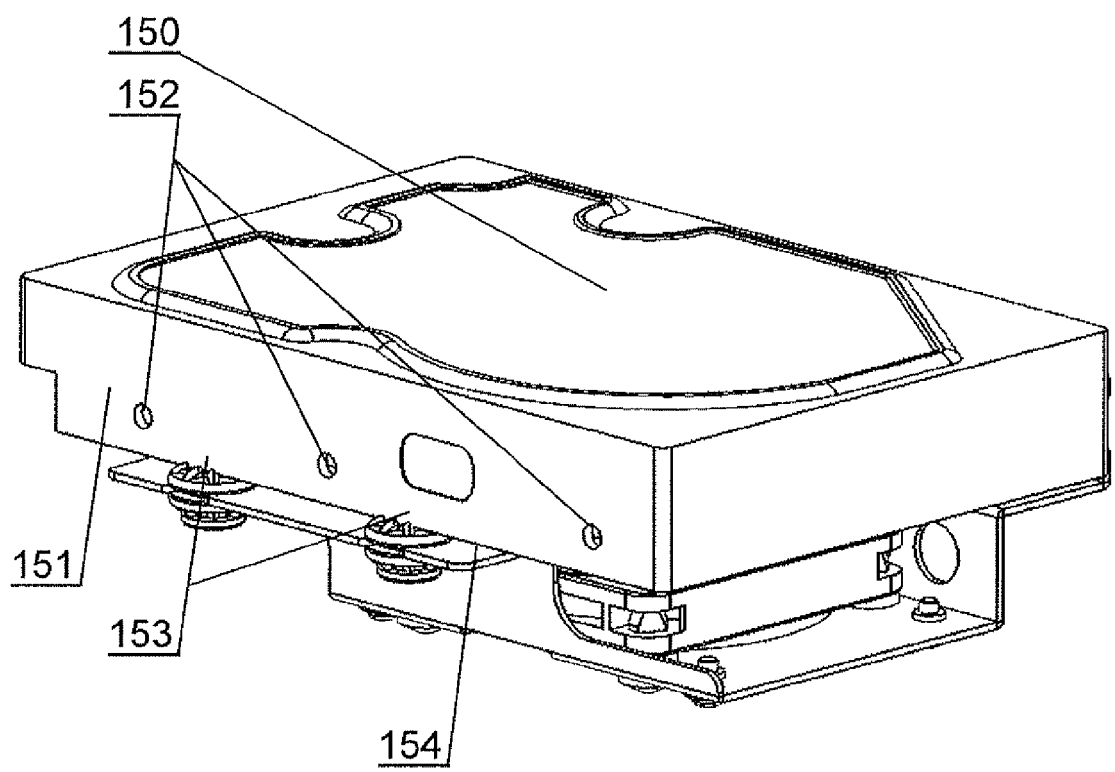
FIG. 5 shows a perspective view of the attachment assembly with a hard disk mounted to it.

The cradle 101 has the first arm 105 arranged such that the electronic device 150, shown in FIG. 5, is fastened to the first arm 105 using the electronic device 150 bottom fastening means. In addition, the cradle 101 has the second arm 108 arranged such that the electronic device 150 is fastened to the second arm 108 using the electronic device 150 side fastening means.

The assembly of FIG. 1 further comprises 4 attenuating elements 103 fastened to the arms 105 and 108 by means of attenuating elements fastening means, for example screws 104. Preferably the attenuating elements fastening means can be any suitable fastening means that will provide a rigid connection. In one embodiment a hard disk drive mounts via shoulder screws and grommets, being attenuating elements 103, to a cradle 101, which also houses the system fan 107 with its fastening means 106.

A disk drive fastened with the attenuating elements 103 and attenuating elements fastening means 104 to the cradle 101 is mounted such that the attenuating elements fastening means 104 engage the disk drive from a side and from a bottom part, which typically comprises an uncovered printed circuit board. Such a printed circuit board comprises a disk drive controller that usually has a size of a half or ⅔ of the disk drive bottom part.

The bottom of the disk drive is also often called the base casting, the name coming from the manufacturing process used to create the single piece of aluminum from which it is normally made.

The attenuating elements 103 may be made from the material that is soft enough, so they behave as shock and vibration absorbing elements when the disk drive operates. The attenuating elements 103 prevent the disk drive from damaging in case of a drop of the appliance. The attenuating elements 103 may be made of soft, elastic material, such as elastomeric material, silicone rubber, polyutherane or polyether-based polyutherane.

The most important parameter of such material is its hardness. For example when measured according to the ASTM D 2240 standard in Shore A units, the preferred vale is expected to be within a range starting at 3 and ending at 20.

Other parameters like density in g/cm3 at about 1.3 (measured according to ASTM D 729) or compression in % at about 25% at 23 degrees Celsius (measured according to ASTM D 395) may also be advantageous. Another parameter is tan δ, which in one embodiment of the present technical concept, may be set in proximity to 0,3. However the most important parameter is still hardness.

The fastening means 106 may have density and compression similar to the attenuating elements 103. Nevertheless its hardness shall preferably be within a range starting at 30 and ending at 50.

Figure 2:
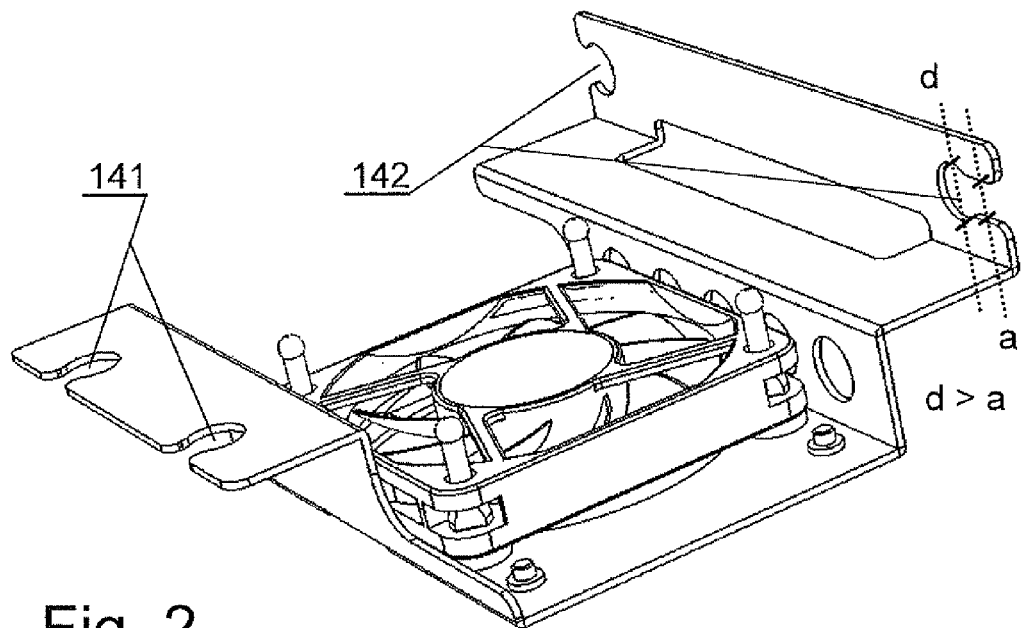
FIG. 2 shows a perspective view of the attachment assembly of FIG. 1 with attenuating elements removed.

FIG. 2 shows a perspective view of a first embodiment of an attachment assembly of FIG. 1 with attenuating elements removed. In this embodiment the attenuating elements 103 are manufactured separately from the cradle 101, therefore the cradle 101 comprises cut-outs 141 in the first arm 105 and 142 in the second arm 108, adapted for receiving the attenuating elements 103. In another embodiment the cradle 101 may have the attenuating elements 103 being parts of the cradle 101 and in such a case the cut-outs 141 are not necessary. In yet another embodiment the cut sections 141, 142 may have a shape of through holes.

Figure 3:
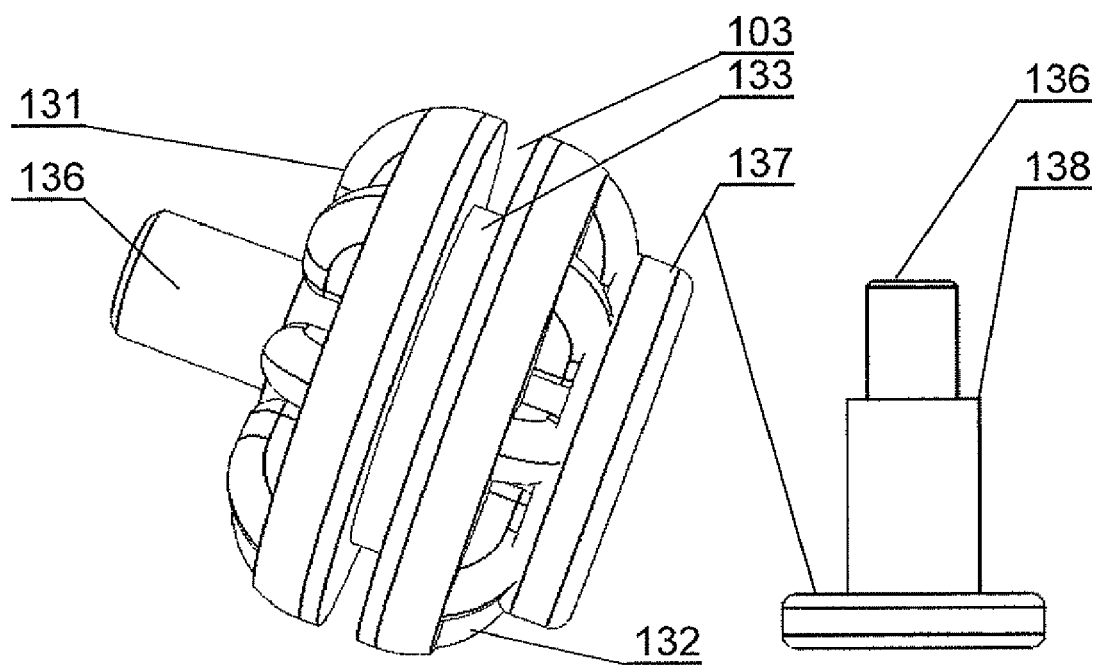
FIG. 3 shows a perspective view of an attenuating element and attenuating elements fastening means connected together.

FIG. 3 shows an attenuating element and attenuating elements fastening means connected together. The attenuating element comprises two outer elements 131, 132 having a first diameter and a connecting element 133 having a second diameter that is smaller than the diameter of the elements 131, 132. By means of this arrangement the cut-outs 141 and 142 can receive the attenuating elements. The attenuating elements comprise a through hole for receiving an attenuating element fastening means.

In this embodiment the attenuating element fastening means is a screw comprising a head 137 and a threaded part 136. Additionally a center element 138 is provided, which preferably has no thread. This allows for better movement of the assembly when protected by the attenuating elements 103.

Additionally it is advisable to mount the attenuating elements 103 with the attenuating element fastening means such that the attenuating elements 103 are not squeezed by the mount so as to maintain their damping properties. However, in one embodiment of the attachment assembly, a diameter of the connecting element 133 can be smaller than a diameter of the cut-outs to allow inserting the fastening means.

An attenuation element 103 may have a grommet-like portion on each end which may be pushed into corresponding cut-outs 141, 142 on the cradle 101. Later the attenuating elements 103 are fixed with the attenuating element fastening means.

The outer elements 131, 132 preferably have a cross-section, along the hole for receiving the attenuating element fastening means, substantially of a shape of a quadrilateral with two sides parallel. The 133 section opening has preferably a shape of a circle.

Figure 4:
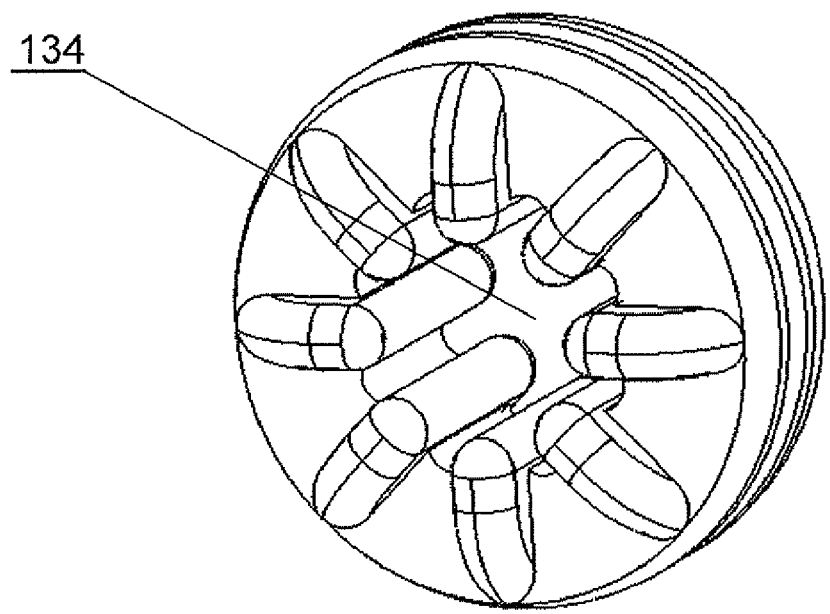
FIG. 4 shows a perspective view of the attenuating element shown in FIG. 3.

FIG. 4 shows a perspective view of an attenuating element. The through hole 134 extends through both outer elements 131, 132 and the connecting element 133.

FIG. 5 shows a perspective view of the attachment assembly with a hard disk 150 mounted in it. The hard disk 150 is fastened to the cradle 101 by means of four attenuating elements 103 and attenuating elements fastening means 104. The attenuating elements 103 are placed such that the attenuating elements fastening means 104 protruding from them can be received by the fastening means receiving sections of the hard disk 150. In a typical embodiment screws 104 will match screw holes of the hard disk 150.

Additionally the hard disk drive 150 comprises side fastening means 152 made in a side 151 of the disk drive 150 and bottom fastening means 153 made in a bottom 154 of the disk drive 150. Similarly corresponding fastening means are present in the hard disk drive 150 on the side facing the sides where the fastening means 152 and 153 are situated. Typically hard disk drive 150 fastening means 152, 153 have a form of a threaded hole or a latch.

Figure 6:
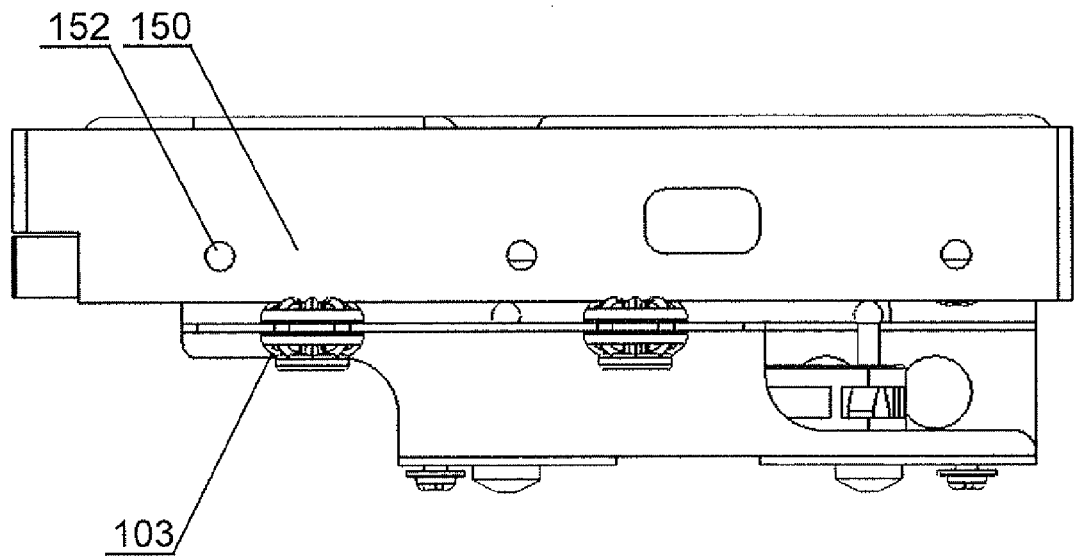
FIG. 6 shows a side view of the attachment assembly with the hard disk.

FIG. 6 shows a side view of the attachment assembly with the hard disk 150.

Figure 7:
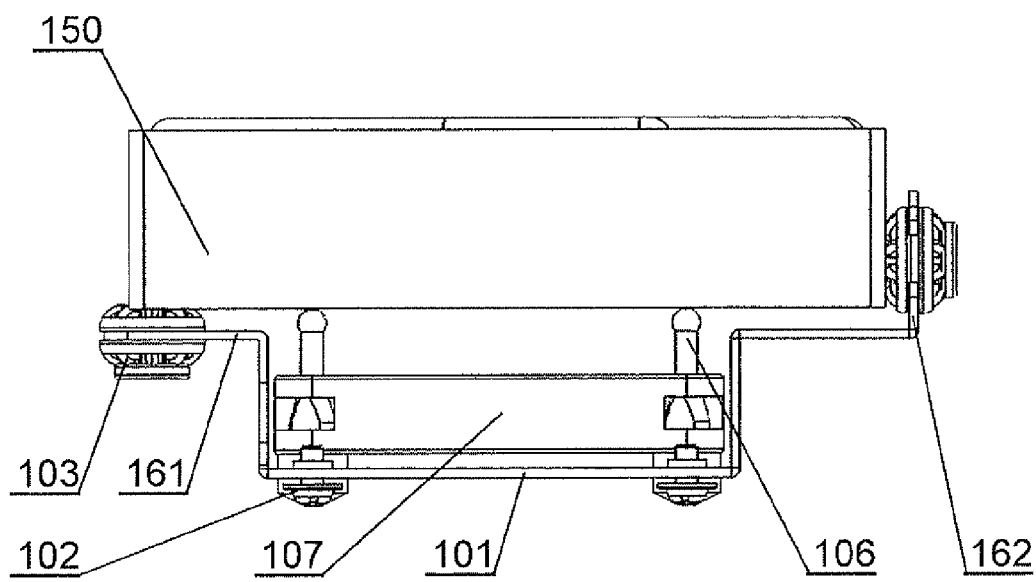
FIG. 7 shows a front view of the attachment assembly with the hard disk.

FIG. 7 shows a front view of the attachment assembly with the hard disk 150.

Figure 8:
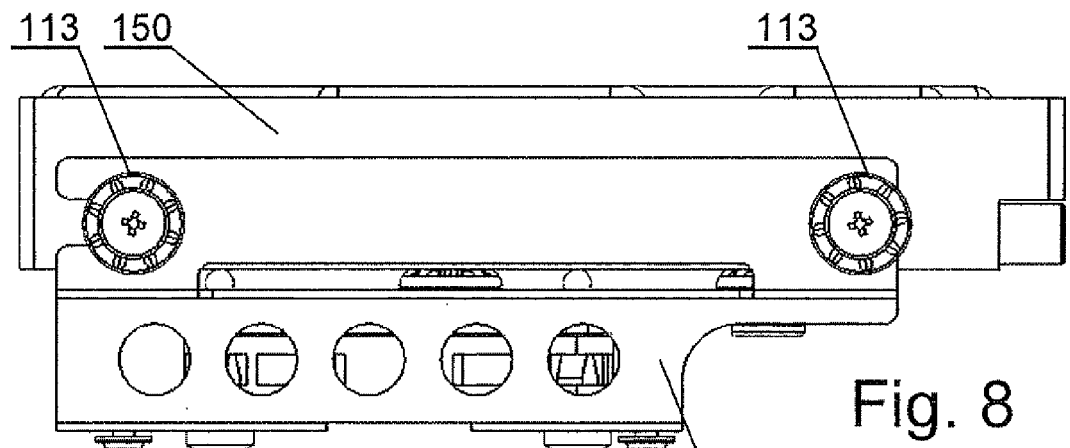
FIG. 8 shows a side view of the attachment assembly with the hard disk.

FIG. 8 shows a side view of the attachment assembly with the hard disk 150. As can be seen the cradle 101 has been perforated. This may be beneficial in order to reduce the amount of material used as well as reduction of weight plus an improved airflow may be achieved. Nevertheless, preferably any perforation shall not reduce rigidness of the cradle 101, which in a best mode of carrying out the invention, should not be pliable.

Figure 9:
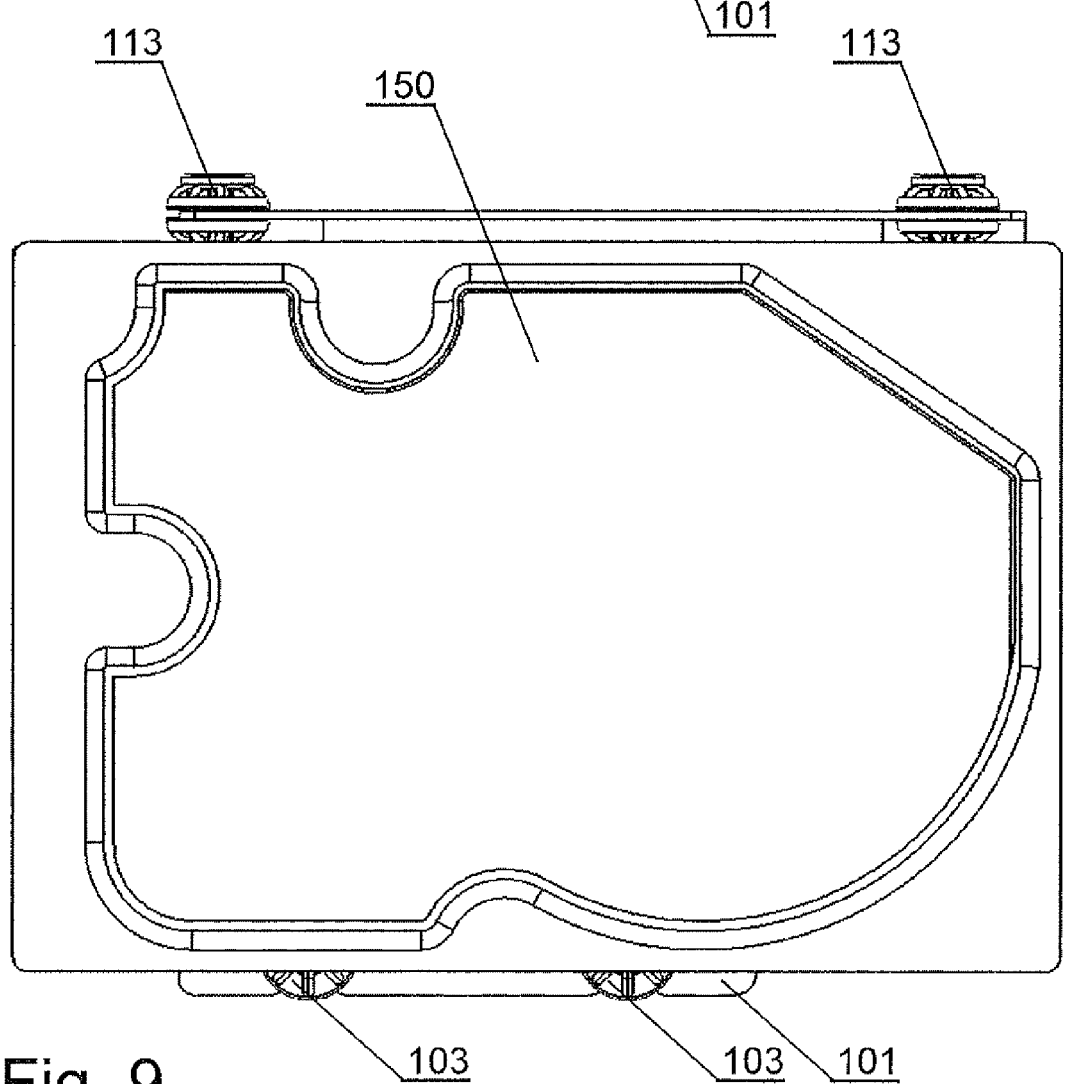
FIG. 9 shows a top view of the attachment assembly with the hard disk;.

FIG. 9 shows a top view of the attachment assembly with the hard disk 150.

Figure 10:
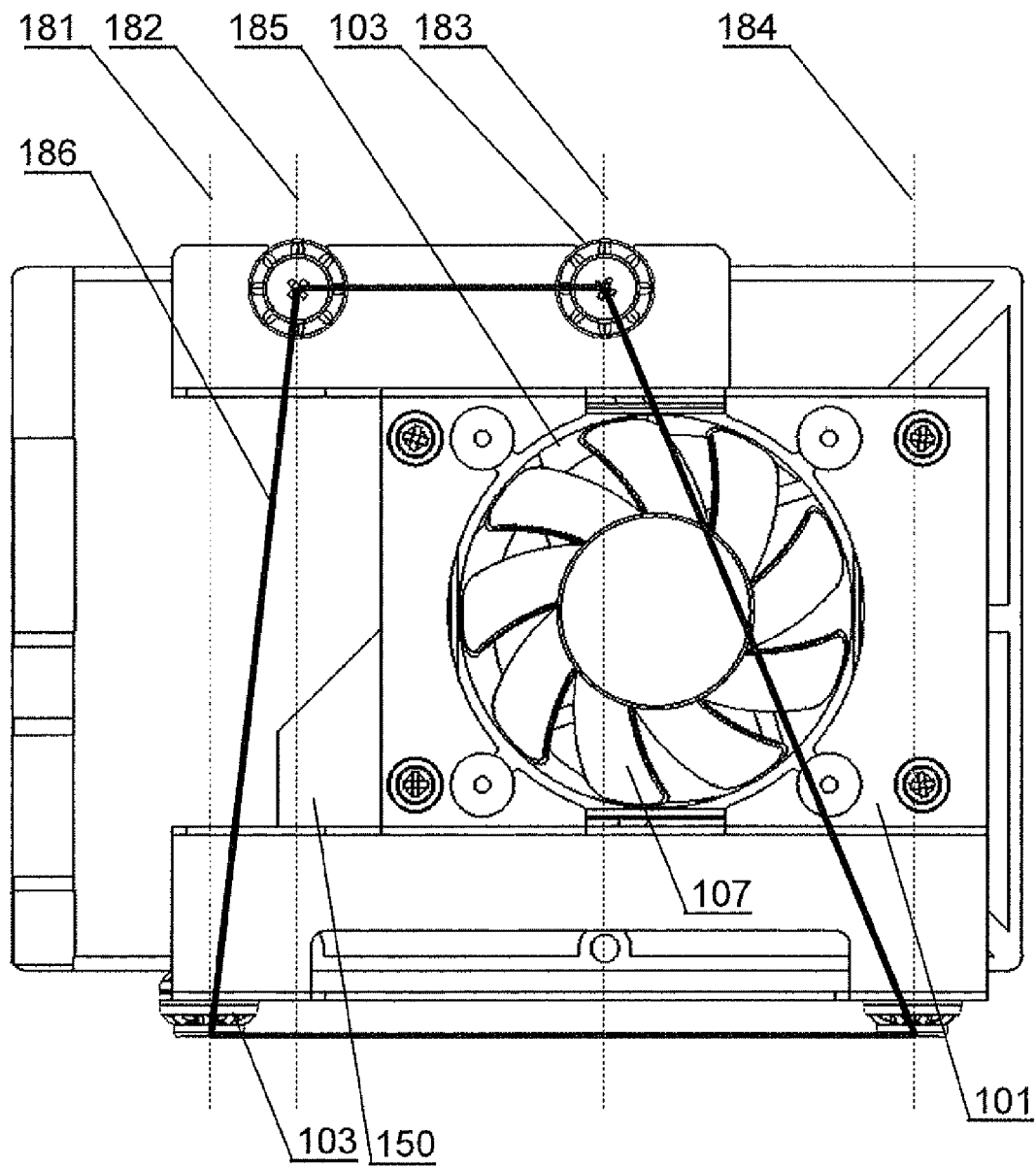
FIG. 10 shows a bottom view the attachment assembly with the hard disk.

FIG. 10 shows a bottom view of the attachment assembly with the hard disk 150. As can be easily seen the axes 181-184 of mounting of the attenuating elements are not symmetrical. In this example each attenuating element is mounted at a different X axis value. Preferably the scheme of mounting of the attenuating elements 103 is that they are positioned such that, when connected by imaginary lines, a shape of a quadrilateral with two sides parallel is formed 186, which is best seen when looking at the cradle 101 from its bottom 109 or top side. This has an advantage of setting a vibration vector outside typical X, Y or Z axes. Such an arrangement has a further advantage of reducing any vibrations transferred to a chassis if such vibrations occur.

As can be seen from this side, the cradle 101 has an opening 185 in the bottom part 109 so as to facilitate air flow from underneath of the cradle 101 to the fan 107.

The embodiments presented have been described in relation to a hard disk drive, but the attachment assembly according to the invention can be used for mounting other electronic devices as well, for example an optical disc drive.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. An attachment assembly, for mounting at least one electronic device (150), the electronic device (150) having side fastening means (152) and bottom fastening means (153), the attachment assembly comprising
 a cradle (101) with a bottom part (109) wherein the cradle (101) comprises a first arm (105) arranged such that the electronic device (150) is fastened to the first arm (105) using the electronic device (150) bottom fastening means (153), and a second arm (108) arranged such that the electronic device (150) is fastened to the second arm (108) using the electronic device (150) side fastening means (152);
 a fan (107) is mounted under the electronic device (501) and arranged between the first arm (105) and the second arm (108) of the cradle (101), such that air is blown towards the electronic device (501) mounted to the cradle;
 the cradle (101) has an opening (185) in the bottom part (109) so as to facilitate air flow from underneath of the cradle (101) to the fan (107).

2. The attachment assembly according to claim 1, wherein the first arm (105) has an offset (115) to form a fan cavity (115) for inserting the fan (107), the offset being formed by a first extension part (110), the bottom part (109) and the second arm (108) or a second extension part (111) wherein planes of the a first extension part (110) and the second arm (108) are situated substantially perpendicularly to the plane (161) of the first arm (105).

3. The attachment assembly according to claim 1, wherein the fan (107) is arranged on the bottom part (109) of the cradle (101).

4. The attachment assembly according to claim 1, wherein the fan (107) is mounted with flexible fastening means (106).

5. The attachment assembly according to claim 4, wherein sway space is provided in proximity to the fan (107).

6. The attachment assembly according to claim 1, wherein the fan (107) receives air from outside a chassis to which the attachment assembly is mounted.

7. The attachment assembly according to claim 1, wherein the cradle (101) has first cut-outs (141) in the first arm (105) and second cut-outs (142) in the second arm (108)7 adapted for receiving attenuating elements (103, 113).

8. The attachment assembly according to claim 7, wherein the attenuating elements (103, 113) are made of a material that has hardness in a range between 3 and 20 when measured in Shore A scale and have a through hole for receiving a fastening means (104).

9. The attachment assembly according to claim 7, wherein the received attenuating elements (103, 113) are positioned such that, when connected by imaginary lines, a shape of a quadrilateral with two sides parallel is formed (186).

10. The attachment assembly according to claim 1, wherein the fan (107) is mounted on an external casing and inserted in an opening (185) made in the bottom part (107).

* * * * *

UNITED STATES PATENT AND TRADEMARK OFFICE
CERTIFICATE OF CORRECTION

PATENT NO. : 7,839,639 B2  Page 1 of 1
APPLICATION NO. : 12/469807
DATED : November 23, 2010
INVENTOR(S) : Radoslaw Najbert It is certified that error appears in the above-identified patent and that said Letters Patent is hereby corrected as shown below:

Column 8

Claim 7, line 21 should be corrected as follows:
    Change: "(108)7"
    To:     "(108)"

Signed and Sealed this
First Day of March, 2011

David J. Kappos
*Director of the United States Patent and Trademark Office*